United States Patent [19]

Yoshimura et al.

[11] Patent Number: 4,545,453
[45] Date of Patent: Oct. 8, 1985

[54] AUTOMATIC RUNNING WORK VEHICLE

[75] Inventors: Shingo Yoshimura, Sakai; Katsumi Ito; Shigeru Tanaka, both of Osaka, all of Japan

[73] Assignee: Kubota, Ltd., Japan

[21] Appl. No.: 552,436

[22] Filed: Nov. 16, 1983

[30] Foreign Application Priority Data

Jun. 28, 1983 [JP] Japan .............................. 58-118743

[51] Int. Cl.⁴ .............................................. B62D 5/00
[52] U.S. Cl. ..................................... 180/131; 56/10.2; 56/DIG. 15
[58] Field of Search ......................... 180/131, 79, 167; 244/175; 56/10.2, DIG. 15

[56] References Cited

U.S. PATENT DOCUMENTS

| | | | |
|---|---|---|---|
| 2,952,842 | 9/1960 | Bourdon | 180/131 |
| 3,079,107 | 2/1963 | Auld et al. | 244/175 X |
| 4,135,594 | 1/1979 | Lestradet | 180/79 |
| 4,286,151 | 8/1981 | Lestradet | 180/79 X |

Primary Examiner—John A. Pekar
Attorney, Agent, or Firm—Kane, Dalsimer, Kane, Sullivan and Kurucz

[57] ABSTRACT

An automatic running work vehicle adapted to automatically run straight along a predetermined boundary of a running area by being subjected to steering control based on the combination of parameters detected by a follower sensor for detecting the boundary and an orientation sensor for detecting the running direction.

11 Claims, 9 Drawing Figures

AUTOMATIC RUNNING WORK VEHICLE

BACKGROUND OF THE INVENTION

1. Field of the Invention

The present invention relates to an automatic running work vehicle, and more particularly to such a work vehicle which is equipped with follower sensors for detecting predetermined boundaries of running areas so as to run along the boundary automatically.

2. Description of the Prior Art

Automatic running work vehicle of this type heretofore known are provided with follower sensors for detecting the boundaries of running areas to automatically correct the running direction based on the result of detection and automatically run the vehicle in a predetermined direction along the boundary under follower control.

However, when the automatic running work vehicle is designed as a ground working vehicle such as a mower and provided with the conventional follower control means to run along the boundary of a worked area and an unworked area which is the above-mentioned boundary of running area, the vehicle has the drawback of leaving zigzag traces or running in deviated directions because the boundary generally has many irregularities along which the vehicle runs under follower control instead of running straightforwardly.

SUMMARY OF THE INVENTION

An object of the present invention, which has been accomplished in view of the above situation, is to provide an automatic running work vehicle equipped with control means which assures a high straightforward running performance even when the boundaries of running areas are in a poor condition.

To fulfill the above object, the invention provides an automatic running work vehicle equipped with follower sensors and characterized in that the vehicle has an orientation sensor for detecting the running direction to compare the detected orientation with a reference orientation and steering control means by which when the orientation difference between the detected orientation and the reference orientation is in excess of a predetermined value, the vehicle is steered at a specified angle until the orientation difference decreases to less than an impermissible error while being held out of steering control by the follower sensor.

Because of the above feature, the present vehicle has the following outstanding advantage.

The work vehicle of the present invention, when under follower control, is also subjected to orientation control so as to limit variations in the running direction of the vehicle body to not greater than a predetermined range for the control of the running direction, with the result that the vehicle runs straightforward properly without greatly deviating from the desired direction even if the boundaries of running areas are in a poor condition.

Other objects and advantages of the present invention will become apparent from the following description.

BRIEF DESCRIPTION OF THE DRAWINGS

The drawings show embodiments of automatic running work vehicle of the present invention.

DESCRIPTION OF THE PREFERRED EMBODIMENTS

Figure 1:
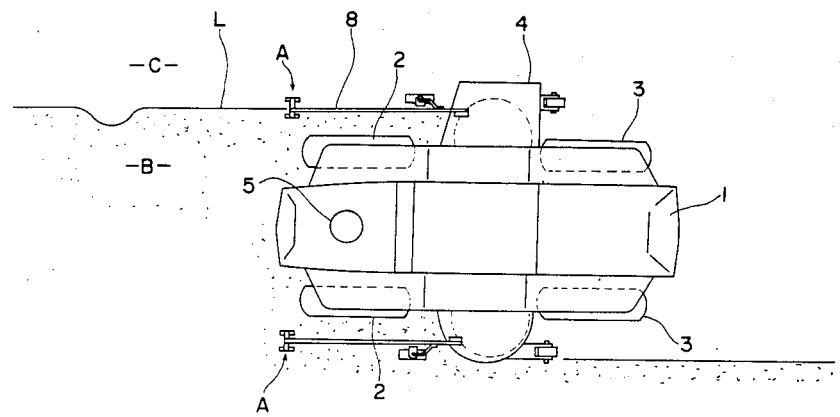
FIG. 1 is an overall plan view of a mowing vehicle.

FIG. 1 shows a mowing vehicle as an automatic running vehicle. The body 1 of the vehicle has a mower 4 vertically movably suspended therefrom and positioned between its front and rear wheels 2, 3. The vehicle body 1 is provided on opposite sides of its front portion with follower sensors A, A having the construction to be described below for detecting the boundary of a running area, i.e., the boundary L between an unmowed area B and a mowed area C of a mowing site.

The vehicle body 1 is further provided with a geomagnetic sensor 5 serving as an orientation sensor for detecting the running direction of the vehicle body 1. The geomagnetic sensor 5 is adapted to detect the orientation $\Psi$ in which the vehicle body 1 is directed by detecting the intensity of the geomagnetism at a point of measurement.

The front wheels 2 and 2, which serve as steering wheels, are steered a specified amount by a control unit 6 rightward or leftward along the boundary detected by the follower sensors A and based on the orientation detected by the geomagnetic sensor 5.

Figure 2:
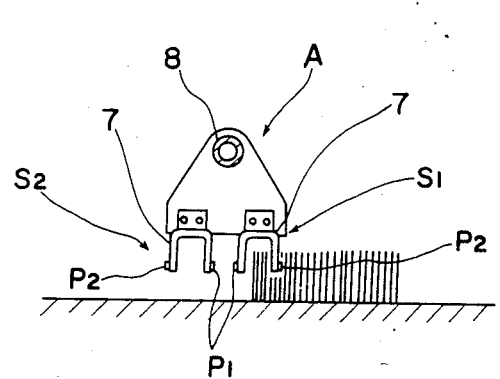
FIG. 2 is a fragmentary front view of a follower sensor.

The follower sensor A comprises two photosensors S1, S2 as shown in FIG. 2. A sensor mount frame 8 attached to the mower 4 is fixedly provided with substantially U-shaped sensor frames 7, 7. Each photosensor includes a pair of light-emitting element P1 and photocell P2 attached to the opposed inner sides of the frame 7 for sensing the presence or absence of grass to be brought into the space therebetween with the travel of the vehicle body 1 to detect the boundary L between the unmowed area B and the mowed area C. The sensor A is not limited to one comprising the photosensors S1, S2 but can be composed of other sensors of the non-contact or contact type or any other type.

A control system will be described below for automatically steering the front wheels 2, 2 based on the results obtained by the follower sensors A and the orientation sensor 5 of the above constructions for detecting the boundary L and the orientation $\Psi$ of the vehicle body.

Figure 3:
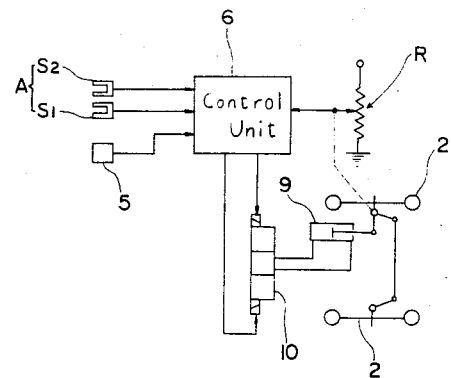
FIG. 3 is a block diagram of a control system.

With reference to FIG. 3 showing the control system, the two photosensors S1, S2 constituting the follower sensor A and the orientation sensor 5 feed signals to the control unit 6 which consists essentially of a microcomputer. Based on the detection signals from the sensors S1, S2 and 5, the control unit 5 calculates and delivers control signals for driving an electromagnetic valve 10 which operates a hydraulic cylinder 9 serving as an actuator for steering the front wheels 2, 2.

Stated more specifically, when the orientation difference $\Delta\Psi$ between the orientation $\Psi$ detected by the geomagnetic sensor 5 and a predetermined reference orientation $\Psi_0$ is not greater than a predetermined value $\Delta\Psi_1$, the vehicle is subjected to usual follower control (so-called vari-control) as in the prior art based on the result of detection of the boundary L by the follower sensor A. On the other hand, if the orientation difference $\Delta\Psi$ is in excess of the predetermined value $\Delta\Psi_1$, the vehicle is temporarily brought out of the follower control and steered at a predetermined angle $\Psi'$ until the orientation difference decreases to less than an impermissible error $\Delta\Psi_2$.

Accordingly the vehicle body 1 is subjected to the follower control based on the result actually obtained by detecting the boundary L of the running area and also to orientation control based on the difference between the reference orientation $\Psi_0$ and the detected orientation $\Psi$, whereby the variations in the running direction of the vehicle body 1 can be limited to within a predetermined range. This gives the vehicle body 1 greatly improved ability to run straightforward, permitting the vehicle to leave very neat work traces.

Figure 4:
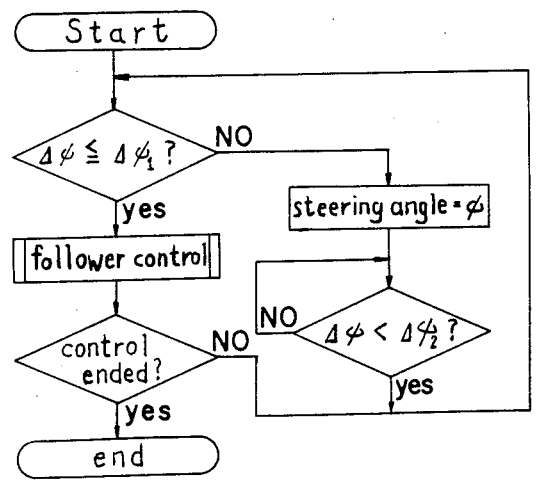
FIG. 4 is a flow chart showing the operation of the control unit.

FIG. 3 further shows a potentiometer R for detecting the actual steering angle of the front wheels 2, 2. The output is given to the control unit 6 for feedback control. FIG. 4 is a flow chart showing the foregoing operation of the control unit 6. The impermissible error $\Delta\Psi_2$ is smaller than the predetermined value $\Delta\Psi_1$.

As the reference orientation $\Psi_0$, the average orientation of the vehicle body in the first course of the mowing site or the orientation thereof during running in the preceed-course may be taken.

Further the angle $\Psi'$ at which the vehicle body is steered until the orientation difference $\Delta\Psi$ decreases to less than the impermissible error $\Delta\Psi_2$ may be set according to the difference $\Delta\Psi$.

Another embodiment of the invention will be described below.

Figure 5:
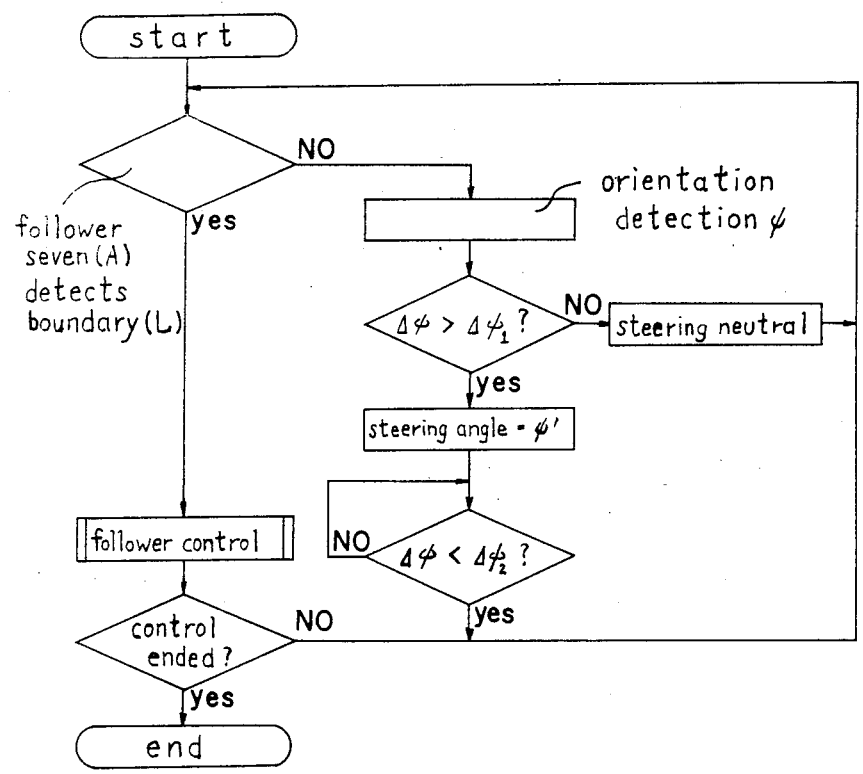
FIG. 5 is a flow chart showing the operation of the control unit of another embodiment.

According to this embodiment, the mowing vehicle of the construction shown in FIGS. 1 to 3 is so adapted that the condition of steering control according to the orientation difference $\Delta\Psi$ is determined based on the result of detection of the boundary L by the follower sensor A as shown in the flow chart of FIG. 5.

More specifically, while the photosensor S1 of the pair detects the unmowed area B with the other photosensor S2 detecting the mowed area C, i.e., while the follower sensor A detects that the vehicle body is along the boundary L, the steering assembly is held in neutral position as in the prior art to advance the vehicle body 1 straight, whereas when both the photosensors S1, S2 detect the unmowed area B or the mowed area C, i.e., when the follower sensor A detects that the vehicle body is deviated from the boundary L, the control parameter for steering control is changed from the result obtained by the follower sensor A to the result obtained by the geomagnetic sensor 5 in order to steer the vehicle body 1 based on the orientation difference $\Delta\Psi$ between the orientation $\Psi$ detected by the geomagnetic sensor 5 and the reference orientation $\Psi_0$.

When the orientation difference $\Delta\Psi$ is in excess of the predetermined value $\Delta\Psi_1$, with the follower sensor A detecting that the running direction is deviated from the boundary L, the vehicle body 1 is steered at an angle $\Psi'$ which is larger than under the control of the follower sensor A to correct the running direction until the orientation difference $\Delta\Psi$ decreases to less than the impermissible error $\Delta\Psi_2$.

On the other hand, the orientation difference $\Delta\Psi$, if less than the predetermined value $\Delta\Psi_1$, is interpreted as indicating that the boundary L is in a poor condition due to irregularities. In this case, the steering assembly is forcibly returned to neutral position to advance the vehicle body 1 straight.

Thus, when the vehicle body 1 is automatically run in a specified direction in the same manner as already described, the vehicle body 1 is subjected to both follower control based on the result of detection of the predetermined boundary L and the orientation control based on the result of detection of the running vehicle body, whereby the variations in the running direction of the vehicle body 1 can be reduced even when the boundary L is in a poor condition. The vehicle body 1 therefore exhibits a remarkably improved straightforward running performance to leave very neat work traces.

Still another embodiment of the invention will be described next with reference to FIGS. 6 to 9.

According to this embodiment, steering control based on the orientation difference $\Delta\Psi$ between the orientation $\Psi$ detected by the geomagnetic sensor 5 and the reference orientation $\Psi_0$ is effected while a follower sensor A is in the state of following the boundary. To monitor the vehicle body following the boundary L, the follower sensor A is adapted to have an insensitivity zone d of a larger width than usual in which it is insensitive to the boundary L to be followed.

Figure 6:
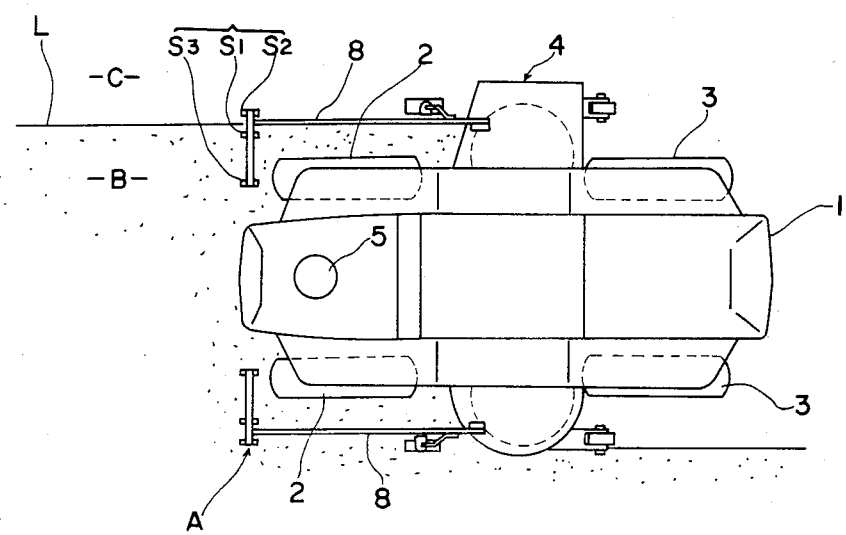
FIG. 6 is an overall plan view showing still another embodiment of mowing vehicle.
Figure 7:
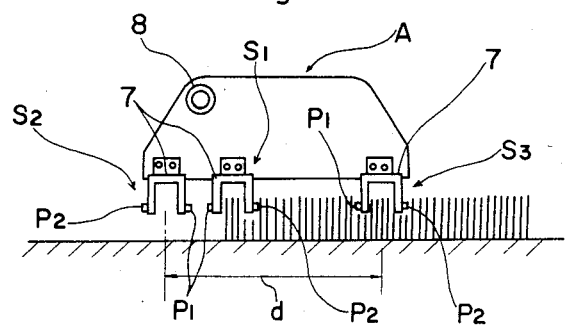
FIG. 7 is a fragmentary plan view of the follower sensor of the same.

With reference to FIGS. 6 and 7, the follower sensor A comprises three photosensors S1, S2 and S3 which are spaced apart by predetermined distances widthwise of the vehicle body 1.

Usually the boundary L is detected by the two adjacent photosensors S1, S2. Over a predetermined range of work area, the vehicle runs reciprocatingly repeating the sequence of running one course from one end of the area to the other end thereof while mowing. Every time the vehicle reciprocatingly travels a predetermined number of courses, No, the follower sensor A detects the boundary L with the outermost photosensor S1 and the photosensor S3 spaced therefrom inwardly of the vehicle body 1 by a larger distance than usual, the sensor A thus being adapted to have the insensitivity zone d of increased width.

Usually, the hydraulic cylinder 9 is operated based on the combination of results obtained by the photosensors S1, S2 which are arranged adjacent to each other for detecting the unmowed area B and the mowed area C so that the outer photosensor S1 detects the mowed area C, with the inner photosensor S2 detecting the unmowed area B, to position the vehicle body 1 along the boundary L. In this state, the vehicle automatically runs at a predetermined speed while mowing and repeatedly changing the direction at the end of each course.

On the other hand, the number of courses covered is measured by counting the number N of changes of the direction. Every time the number N reaches the predetermined number No, the outermost photosensor S1 and the innermost third photosensor S3, which provide the insensitivity zone d of increased width, are used in the next course in place of the combination of the photosensors S1, S2 to steer the front wheels 2, 2 based on the combination of results obtained by the photosensors S1, S3. Furthermore, when the photosensor S1 is detecting the mowed area C, with the photosensor S3 detecting the unmowed area B, the vehicle body is subjected to steering control based on the orientation $\Psi$ detected by the orientation sensor 5 so that the difference $\Delta\Psi$ between the detected orientation $\Psi$ and the reference orientation $\Psi_0$ compared therewith will be less than the impermissible error $\Delta\Psi_2$. In this way, the straightness of the running direction of the vehicle body 1 and the parallelism of courses are automatically corrected every predetermined number of courses, No.

Figure 8:
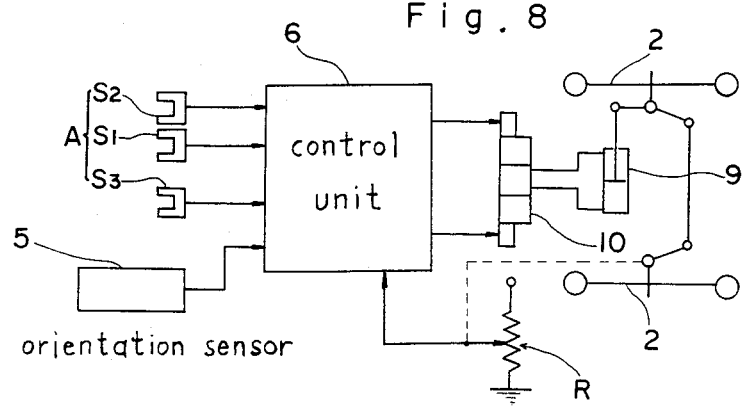
FIG. 8 is a block diagram of the control system of the same.
Figure 9:
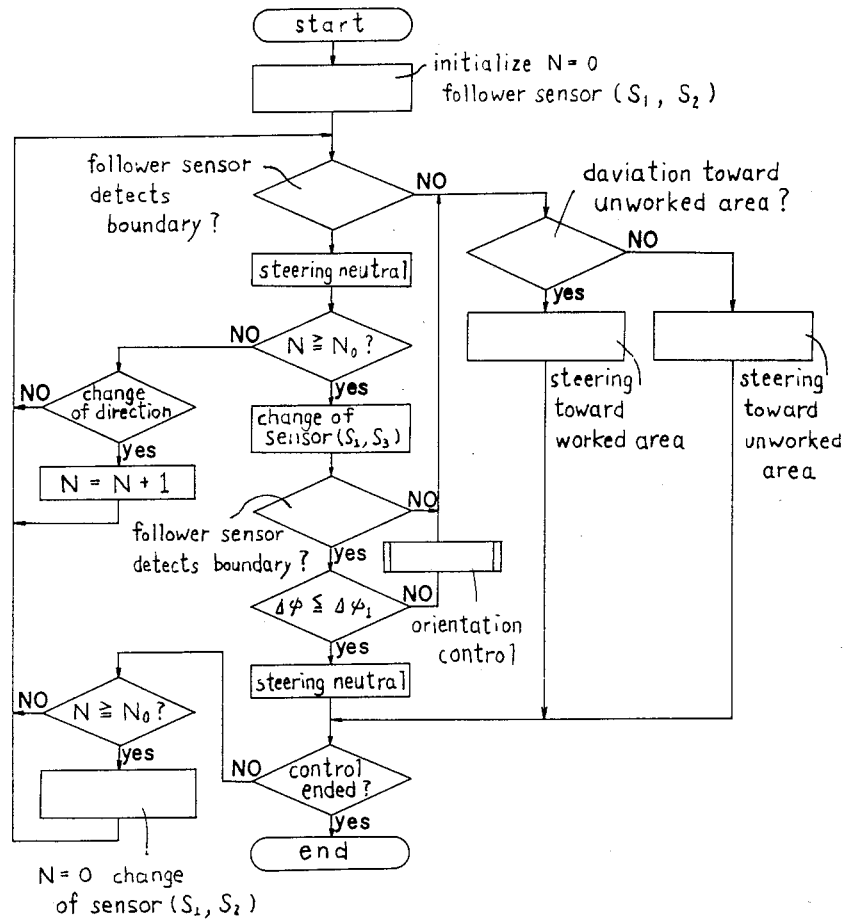
FIG. 9 is a flow chart showing the operation of the control unit.

FIG. 8 is a block diagram showing the control system of the third embodiment described above, and FIG. 9 is a flow chart showing the operation of the control unit of the same.

Instead of providing the photosensor S3 for each of opposite follower sensors A, one photosensor may be disposed, for example, at the center of the vehicle body 1 as a common component of the opposed follower sensors A, A.

We claim:

1. An automatic running work vehicle equipped with follower sensor (A) for detecting a predetermined boundary (L) of a running area so as to run along the boundary (L) automatically, the vehicle being characterized in that the vehicle has an orientation sensor (5) for detecting the running direction to compare the detected orientation ($\Psi$) with a reference orientation ($\Psi_0$) and steering control means by which in response to the detection by the follower sensor (A) and when the orientation difference ($\Delta\Psi$) between the detected orientation ($\Psi$) and the reference orientation ($\Psi_0$) obtained by the comparison is in excess of a predetermined value ($\Delta\Psi_1$), the vehicle is steered at a specified angle ($\Psi'$) until the orientation difference ($\Delta\Psi$) decreases to less than an impermissible error ($\Delta\Psi_2$) while being held out of steering control by the follower sensor (A).

2. An automatic running work vehicle as defined in claim 1 wherein to subject the vehicle to steering control based on the result of comparison between the detected orientation ($\Psi$) and the reference orientation ($\Psi_0$), the vehicle is provided with control means for forcibly returning steering operation to neutral state when the orientation difference ($\Delta\Psi$) is not greater than the predetermined value ($\Delta\Psi_1$).

3. An automatic running work vehicle as defined in claim 1 or 2 wherein the angle at which the vehicle is steered until the orientation difference ($\Delta\Psi$) decreases to less than the impermissible error ($\Delta\Psi_2$) is larger than a usual steering angle as effected by adapting the follower sensor (A) to have a wider insensitivity zone (D).

4. An automatic running work vehicle as defined in claim 1 wherein the vehicle is steered based on the orientation difference ($\Delta\Psi$) when the follower sensor (A) is detecting that the vehicle is not following the boundary (L).

5. An automatic running work vehicle as defined in claim 2 wherein the vehicle is steered based on the orientation difference ($\Delta\Psi$) when the follower sensor (A) is detecting that the vehicle is not following the boundary (L).

6. An automatic running work vehicle as defined in claim 3 wherein the vehicle is steered based on the orientation difference ($\Delta\Psi$) when the follower sensor (A) is detecting that the vehicle is not following the boundary (L).

7. An automatic running work vehicle adapted to automatically run along a predetermined boundary, comprising
    follower sensor means (A) for detecting whether the vehicle is running along the boundary or deviating sideways therefrom and transmitting detection signals,
    orientation sensor means (5) for detecting orientation of the vehicle,
    comparator means connected to the orientation sensor means for comparing an orientation ($\Psi$) detected by the orientation sensor means (5) with a reference orientation ($\Psi_0$) and deriving an orientation difference ($\Delta\Psi$) therebetween, and
    steering control means connected to the follower sensor means (A) and the comparator means and operable to steer the vehicle by follower control in response to the signals from the follower sensor means (A) and by orientation control in response to signals from the comparator means,
    wherein the vehicle is steered by the follower control when the orientation difference ($\Delta\Psi$) is equal to and less than a predetermined value ($\Delta\Psi_1$) and by the orientation control, until the orientation difference becomes a preset value ($\Delta\Psi_2$), when the orientation difference ($\nabla\Psi$) exceeds the predetermined value ($\nabla\Psi_1$).

8. An automatic running work vehicle as defined in claim 7 wherein the follower sensor means includes an outer sensor (S1) and an inner sensor (S2) disposed transversely inwardly of the vehicle and spaced from the outer sensor (S1), the outer and inner sensors each adapted to discriminate a treated area from an untreated area thereby to detect position of the vehicle relative to the boundary.

9. An automatic running work vehicle as defined in claim 8 wherein the outer and inner sensors are adjustably spaced from each other to vary an insensitivity zone of detection of the vehicle relative to the boundary.

10. An automatic running work vehicle as defined in claim 9 wherein each of the sensors comprises a photosensor.

11. An automatic running work vehicle as defined in claim 8 wherein the follower control and the orientation control are effected by predetermined steering angles, respectively.

* * * * *